(12) United States Patent
Nguyen

(10) Patent No.: US 12,488,277 B2
(45) Date of Patent: Dec. 2, 2025

(54) CUSTOMIZING AN ARTIFICIAL INTELLIGENCE MODEL TO PROCESS A DATA SET

(71) Applicant: David T. Nguyen, Rockville, MD (US)

(72) Inventor: David T. Nguyen, Rockville, MD (US)

(*) Notice: Subject to any disclaimer, the term of this patent is extended or adjusted under 35 U.S.C. 154(b) by 1044 days.

(21) Appl. No.: 16/875,792

(22) Filed: May 15, 2020

(65) Prior Publication Data

US 2021/0357757 A1 Nov. 18, 2021

(51) Int. Cl.

| | | |
|---|---|---|
| *G06N 20/00* | (2019.01) | |
| *G06F 16/00* | (2019.01) | |
| *G06F 18/20* | (2023.01) | |
| *G06F 18/21* | (2023.01) | |
| *G06F 18/214* | (2023.01) | |
| *G06F 18/23* | (2023.01) | |
| *G06F 18/24* | (2023.01) | |
| *G06N 3/082* | (2023.01) | |
| *G06N 3/088* | (2023.01) | |
| *G06Q 40/12* | (2023.01) | |
| *H04L 9/00* | (2022.01) | |

(52) U.S. Cl.
CPC ............ *G06N 20/00* (2019.01); *G06F 16/00* (2019.01); *G06F 18/20* (2023.01); *G06F 18/214* (2023.01); *G06F 18/217* (2023.01); *G06F 18/23* (2023.01); *G06F 18/24* (2023.01); *G06N 3/082* (2013.01); *G06N 3/088* (2013.01); *G06Q 40/125* (2013.12); *H04L 9/50* (2022.05)

(58) Field of Classification Search
None
See application file for complete search history.

(56) References Cited

U.S. PATENT DOCUMENTS

| | | | |
|---|---|---|---|
| 2021/0233192 A1* | 7/2021 | Manamohan | G06F 16/2255 |
| 2023/0195845 A1* | 6/2023 | Dasgupta | G06N 5/04 |
| | | | 706/12 |

OTHER PUBLICATIONS

Pang, et al., Cascade Learning by Optimally Partitioning, IEEE Transactions On Cybernetics, vol. 47, No. 12, Dec. 2017, pp. 1-14 (Year: 2017).*
"In Today's Changing World, Learn How to Get Results With AI", website, H2O.ai, https://www.h2o.ai/?gclid=EAlalQobChMI6aaEnoC06QIVeopaBR2cSAKPEAAYASAAEgJchPD_BwE&utm_source=google&utm_medium=cpc&utm_term=machine%20learning&utm_campaign=ml; (6 pages).
"Enabling the AI-Driven Enterprise", website, Enterprise AI, https://www.datarobot.com/, (4 pages).

* cited by examiner

*Primary Examiner* — David R Vincent
(74) *Attorney, Agent, or Firm* — Michael Best & Friedrich LLP

(57) ABSTRACT

A system for customizing an artificial intelligence model to process a data set. The system includes an electronic processor that is configured to receive a data set, train a plurality of artificial intelligence models using the received data set, and determine, for each the plurality of artificial intelligence models, an accuracy. The electronic processor is further configured to receive a selection of an artificial intelligence model, receive one or more adjustments to one or more features or feature weights of the selected artificial intelligence model, and execute the selected artificial intelligence model with the one or more adjustments to categorize records in a data set different from the received data set.

14 Claims, 13 Drawing Sheets

CUSTOMIZING AN ARTIFICIAL INTELLIGENCE MODEL TO PROCESS A DATA SET

SUMMARY

Data analytics is becoming an ever more important tool for organizations in many fields including business and healthcare. It is a challenge to develop effective artificial intelligence models to perform a wide variety of analytical tasks in a wide range of fields. For example, one organization may wish to develop an artificial intelligence model to analyze an unstructured database containing expenditure reports while another organization may wish to develop an artificial intelligence model to analyze a structured database containing legal documents. These two organizations will likely require two different artificial intelligence models to optimally analyze their respective data. Therefore, an organization must often employ one or more software engineers, data scientists, or both to develop an artificial intelligence model for performing an organization specific task.

Embodiments described herein provide, among other things, value enhancing or value optimization software applications and an artificial intelligence (AI) infrastructure. Each value enhancing software application allows a user, for example, a corporate officer or other individual who is not necessarily a data or computer scientist, to dynamically create a hierarchical catalog of records, reports, spreadsheets, line items, or the like by selecting an optimal artificial intelligence model to sanitize, curate, index, and categorize, for example, financial data, whether structured or unstructured, into a hierarchical catalog. The value enhancing software applications provide flexibility and configurability in applying artificial intelligence models.

The AI infrastructure enables large-scale parallel processing of data science algorithms and data processing. For example, applying a recurrent neural network (RNN) or a convolutional neural network (CNN) on 10,000 records takes 1 day (1,440 minutes) on a relatively high processing power computer. In some embodiments, the AI infrastructure described herein can process this number of records in less than 60 minutes and deliver accurate results. In one example, this is achieved by breaking the data set into smaller units and processing them in parallel by computer processes that can be dynamically "spun up" on demand. By processing data in parallel, embodiments described herein allow artificial intelligence models to analyze large data sets (for example, data sets including millions of records) and to be configured using large data sets. Another advantage of the AI infrastructure is that it enables machine learning and training to be run on a user device and submitted to the infrastructure for consolidation. Using federated learning, the AI infrastructure protects the user's confidential information while learning from the user's sensitive data. In some embodiments, only vectorized data is sent from the user's device to the AI infrastructure, thereby avoiding the need to share user's sensitive data.

In some embodiments described herein, a user is able to select a type of artificial intelligence model and customize features, weights, or both utilized by the artificial intelligence model based on the performance of one or more artificial intelligence models. In some embodiments, a user is also able to continuously retrain the artificial intelligence model by modifying data clusters produced by the artificial intelligence model. The modified clusters provide feedback to the artificial intelligence model on how to modify its future predictions or classifications. Allowing a user to modify the data clusters produced by an artificial intelligence model allows the artificial intelligence model to be configured and trained to make predictions or classifications using a small data set (for example, a data set including several hundred records). In some embodiments, a user may retrain the AI using microapplications that seamless integrate AI training capabilities into core business process workflows. For example, in one embodiment, a search engine allows users to find the best prices of products. The search result returns a product clusters and allows the businessperson to make selections to indicate whether an item belongs in the cluster.

Another hurdle to performing the data analytics described herein is user's concerns over data privacy. To address data privacy concerns, embodiments herein describe using vectorization (as noted above) and blockchain techniques to protect user data.

For example, one embodiment provides a system for customizing an artificial intelligence model to process a data set. The system includes an electronic processor that is configured to receive a data set, train a plurality of artificial intelligence models using the received data set, and determine, for each of the plurality of artificial intelligence models, an accuracy. The electronic processor is further configured to receive a selection of an artificial intelligence model, receive one or more adjustments to one or more features or feature weights of the selected artificial intelligence model, and execute the selected artificial intelligence model with the one or more adjustments to categorize records in a data set different from the received data set.

Another embodiment provides a method of customizing an artificial intelligence model to process a data set. The method includes receiving a data set, training a plurality of artificial intelligence models using the received data set, and determining, for each of the plurality of artificial intelligence models, an accuracy. The method also includes receiving a selection of an artificial intelligence model, receiving one or more adjustments to one or more features or feature weights of the selected artificial intelligence model, and executing the selected artificial intelligence model with the one or more adjustments to categorize records in a data set different from the received data set.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms for example, first and second, top and bottom, and the like may be used herein solely to distinguish one entity or action from another entity or action without necessarily requiring or implying any actual such relationship or order between such entities or actions.

Figure 1:
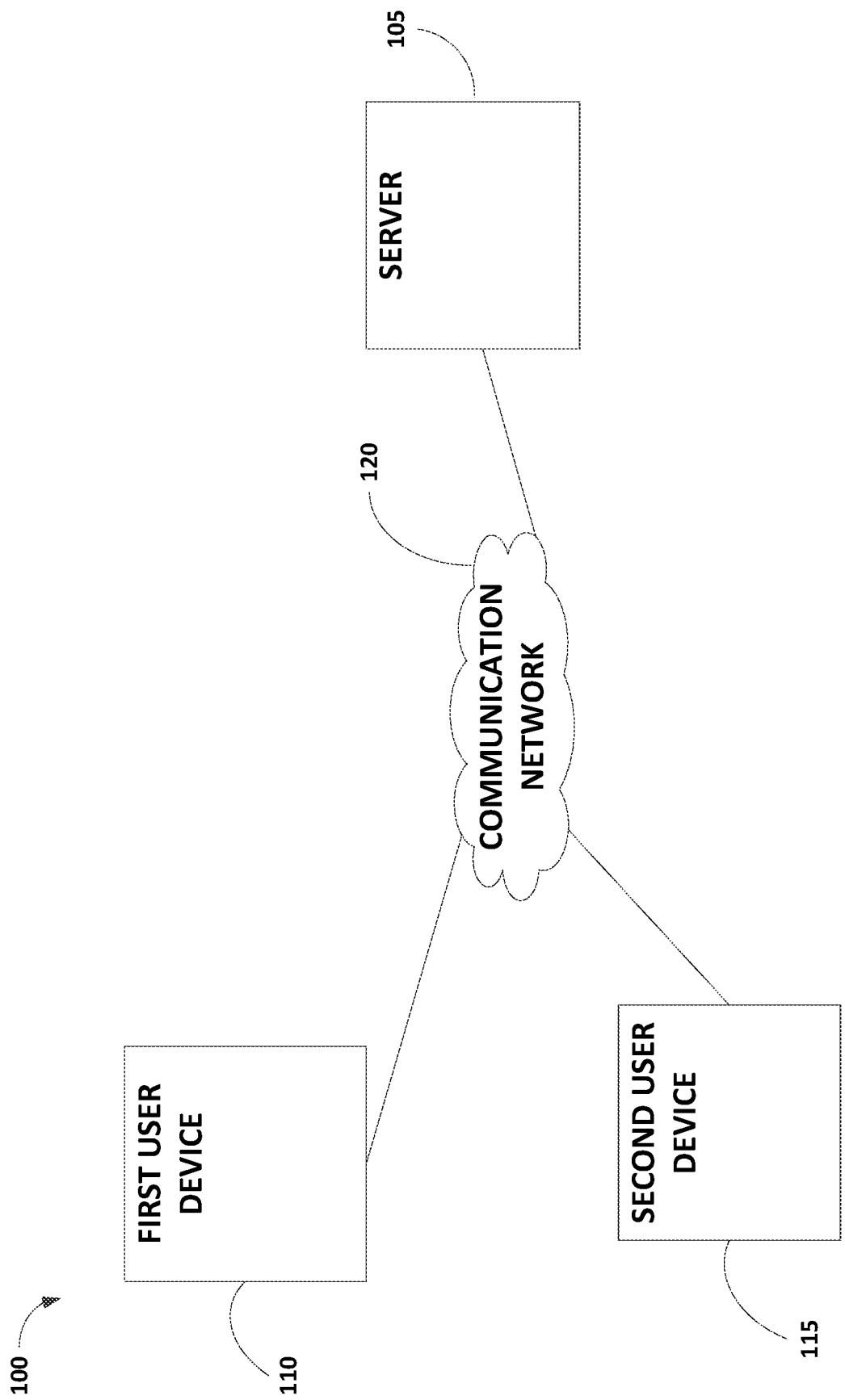
FIG. 1 schematically illustrates a system for customizing an artificial intelligence model to process a data set according to one embodiment.

FIG. 1 schematically illustrates a system 100 for customizing an artificial intelligence model to process a data set. In some embodiments, the system may be a cloud-based system. The system 100 includes one or more servers (for example, a server 105) and one or more user devices (for example, a first user device 110 and a second user device 115). In some embodiments, the servers included in the system 100 are a part of a cloud infrastructure. The servers 105 and the user devices 110 and 115 communicate over one or more wired or wireless communication networks 120. Portions of the wireless communication networks 120 may be implemented using a wide area network, for example, the Internet, a local area network, for example, a Bluetooth™ network or Wi-Fi, and combinations or derivatives thereof. It should be understood that each server included in the system 100 may communicate with any number of user devices, and the two user devices 110 and 115 illustrated in FIG. 1 are purely for illustrative purposes. Similarly, it should also be understood that the system 100 may include a different number of servers than the single server 105 illustrated in FIG. 1. Also, in some embodiments, one of the user devices 110, 115 may communicate with the server 105 through one or more intermediary devices (not shown).

Figure 2:
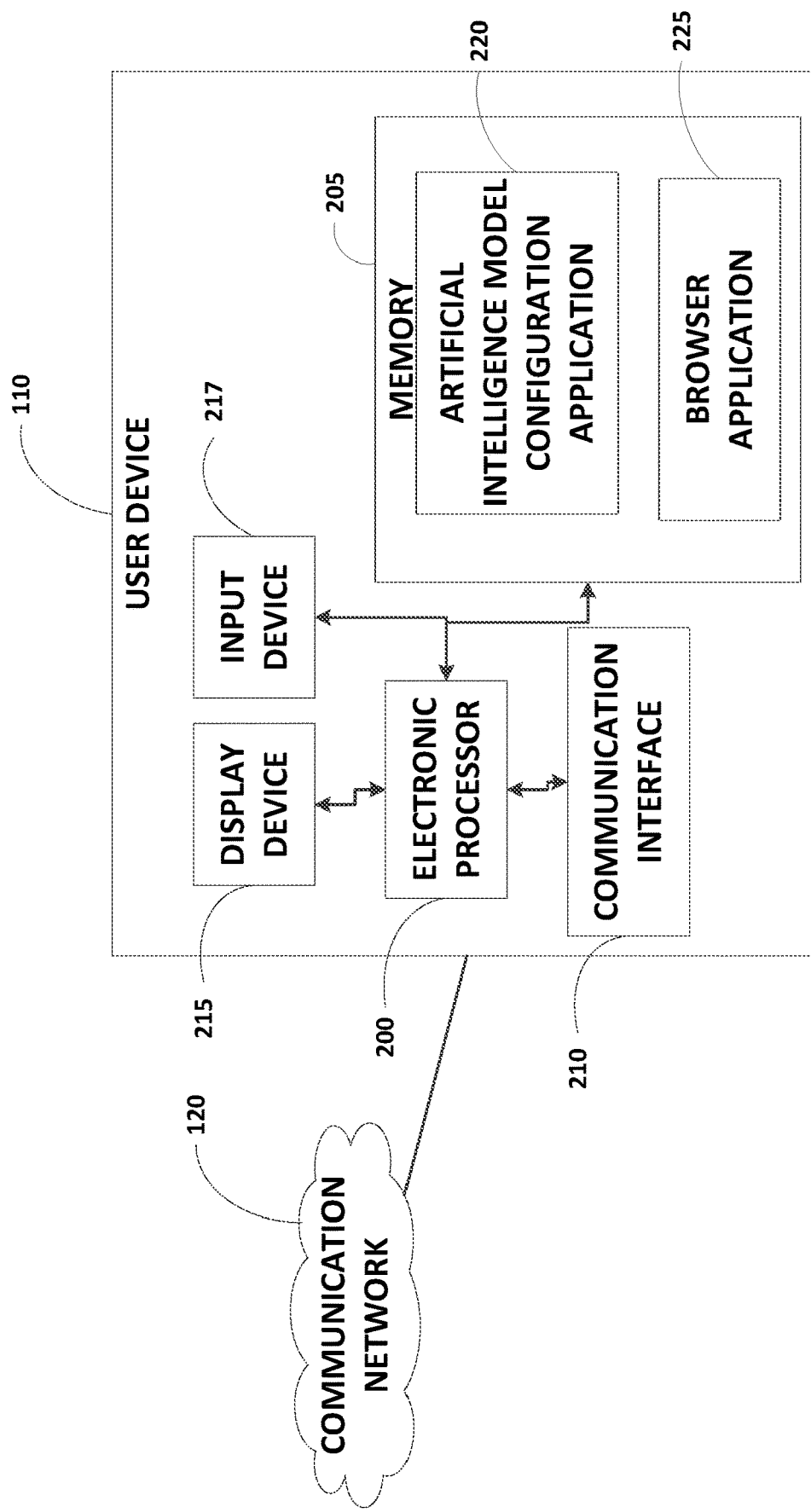
FIG. 2 schematically illustrates a user device included in the system of FIG. 1.

Each of the user devices 110 and 115 is an electronic device, for example, a smart phone, a smart watch, a tablet computer, a laptop computer, mixed reality headsets, a desktop computer, or the like. For example, as illustrated in FIG. 2, the user device 110 includes an electronic processor 200 (for example, a microprocessor, application-specific integrated circuit (ASIC), or another suitable electronic device), a memory 205 (for example, a non-transitory, computer-readable storage medium), and a communication interface 210 for example, a transceiver, for communicating over the communication network 120 and, optionally, one or more additional communication networks or connections. As illustrated in FIG. 2, the user device 110 also includes a display device 215 and an input device 217. The display device 215 may be, for example, a touchscreen, a liquid crystal display ("LCD"), a light-emitting diode ("LED") display, an organic LED ("OLED") display, an electroluminescent display ("ELD"), and the like. The input device 217 may be, for example, a keypad, a mouse, a touchscreen (for example, as part of the display device 215), a microphone, a camera, or the like. The electronic processor 200, memory 205, communication interface 210, display device 215, and input device 217 communicate wirelessly, over one or more communication lines or buses, or a combination thereof. It should be understood that first the user device 110 may include additional components than those illustrated in FIG. 2 and may perform additional functionality than the functionality described herein. Also, it should be understood that, although not described or illustrated herein, the second user device 115 may include similar components and perform similar functionality as the first user device 110.

As illustrated in FIG. 2, the memory 205 of the user device 110 includes a user side artificial intelligence model configuration application 220 and a browser application 225. It should be understood that the memory 205 may store additional applications and data, and the applications and data stored in the memory 205 may be stored on multiple memory devices or modules. Also, in some embodiments, the functionality described herein as being provided by the user side artificial intelligence model configuration application 220 may be distributed and combined in various configurations.

The user side artificial intelligence model configuration application 220 (when executed by the electronic processor 200) is configured to interface with the server 105, to provide a user interface that allows a user to make selections of and adjustments to artificial intelligence models on the server 105, and vectorize data sent to the server 105. In some embodiments, the user side artificial intelligence model configuration application 220 is implemented as a web-browser extension and may be accessed when the browser application is executed by the electronic processor 200. In other embodiments, the user side artificial intelligence model configuration application 220 may be configured as a dedicated-purposes browser application configured to access a specific web page or specific web-based application.

The browser application 225 (as executed by the electronic processor 200) allows the user device 110 or 115 to access a web page, including web-based applications. In some embodiments, the browser application 225 is configured as a generic browser application configured to access any web page accessible over a communication network, for example, the Internet. For example, the browser application 225 may include Internet Explorer® provided by Microsoft Corporation, Edge® provided by Microsoft Corporation, Safari® provided by Apple, Inc., Chrome® provided by Google LLC, or Firefox® provided by Mozilla Corporation.

Figure 3:
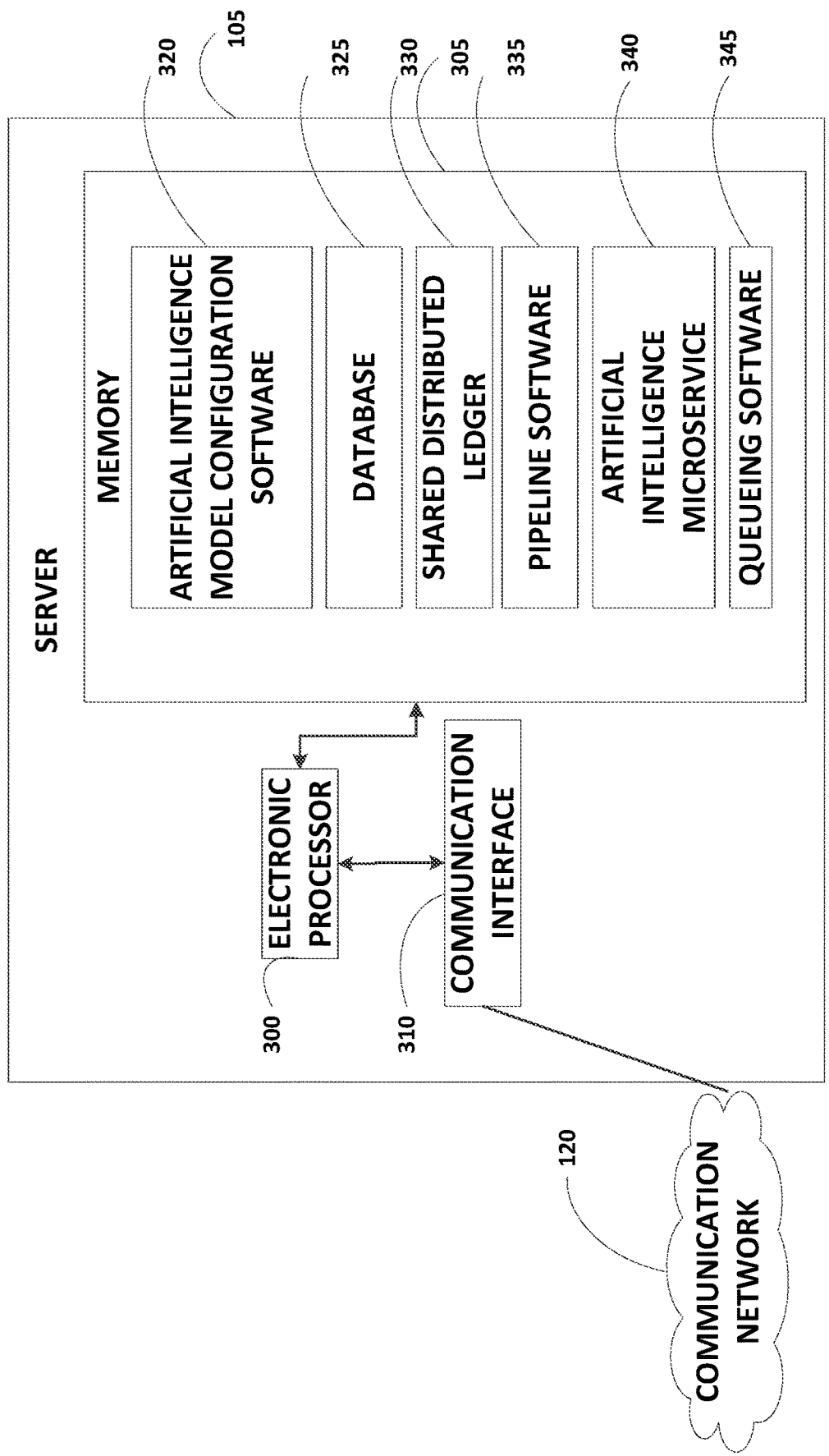
FIG. 3 schematically illustrates a server servicing user devices included in the system of FIG. 1.

As illustrated in FIG. 3, the server 105 is an electronic device that includes an electronic processor 300 (for example, a microprocessor, application-specific integrated circuit (ASIC), or another suitable electronic device), a memory 305 (a non-transitory, computer-readable storage medium), and a communication interface 310, for example, a transceiver, for communicating over the communication networks 120 and, optionally, one or more additional communication networks or connections. The electronic processor 300, the memory 305, and the communication interface 310 communicate wirelessly, over one or more communication lines or buses, or a combination thereof. It should be understood that the server 105 may include additional components than those illustrated in FIG. 3 in various configurations and may perform additional functionality than the functionality described in the present application. Also, the functionality described herein as being performed by the server 105 may be distributed among multiple devices, for example, multiple servers operated within the system 100.

As illustrated in FIG. 3, the server 105 stores in the memory 305 an artificial intelligence model configuration software 320, a database 325, a shared distributed ledger 330, pipeline software 335, an artificial intelligence microservice 340, and queueing software 345. It should be understood that the memory 305 included in the server 105 may store additional applications and data, and the data and applications stored in the memory 305 may be stored on multiple memory devices or modules and may be configured and distributed in various configurations.

The artificial intelligence model configuration software 320 may include one or more application programming interfaces (APIs) that the user side artificial intelligence model configuration application 220 installed on the user devices 110 and 115 may access to manage the customization of an artificial intelligence model. In some embodiments, the artificial intelligence model configuration software 320 is a web-based application which the user side artificial intelligence model configuration application 220 may interface with via a web browser.

The artificial intelligence microservice 340 may include one or more application programming interfaces (APIs) that the user side artificial intelligence model configuration application 220 installed on the user devices 110 and 115 may access to use a customized artificial intelligence model to analyze a large data set. In some embodiments, artificial intelligence model configuration software 320 and the artificial intelligence microservice 340 communicate with other servers included in the system 100 to efficiently train and execute artificial intelligence models.

The database 325 includes data from a plurality of user devices in the system 100. In some instances, the database 325 is both horizontally and vertically scalable. Most relational databases grow vertically. In other words, when a new record is inserted into a database a row is added to the database. If the new record has additional data elements, a new column will also have to be added to the database. In a horizontally scalable database, new columns are added to the database without having to change the structure of the database. In some instances, data sets for training an artificial intelligence model are selected from the database 325. Data sets for analysis by an artificial intelligence model may be selected from the database as well. The pipeline software 335 includes one or more pipelines, each including one or more scripts that select or read data sets from the database 325 and add or write data from the user devices in the system 100 to the database 325.

The shared distributed ledger 330 includes one or more customized artificial intelligence models. A plurality of institutions and organizations may have access to the shared distributed ledger 330 and be able to share one or more customized artificial intelligence models with one another via the shared distributed ledger 330. The queueing software 345 when executed by the electronic processor 300 performs the method 500 of FIG. 9.

Figure 4:
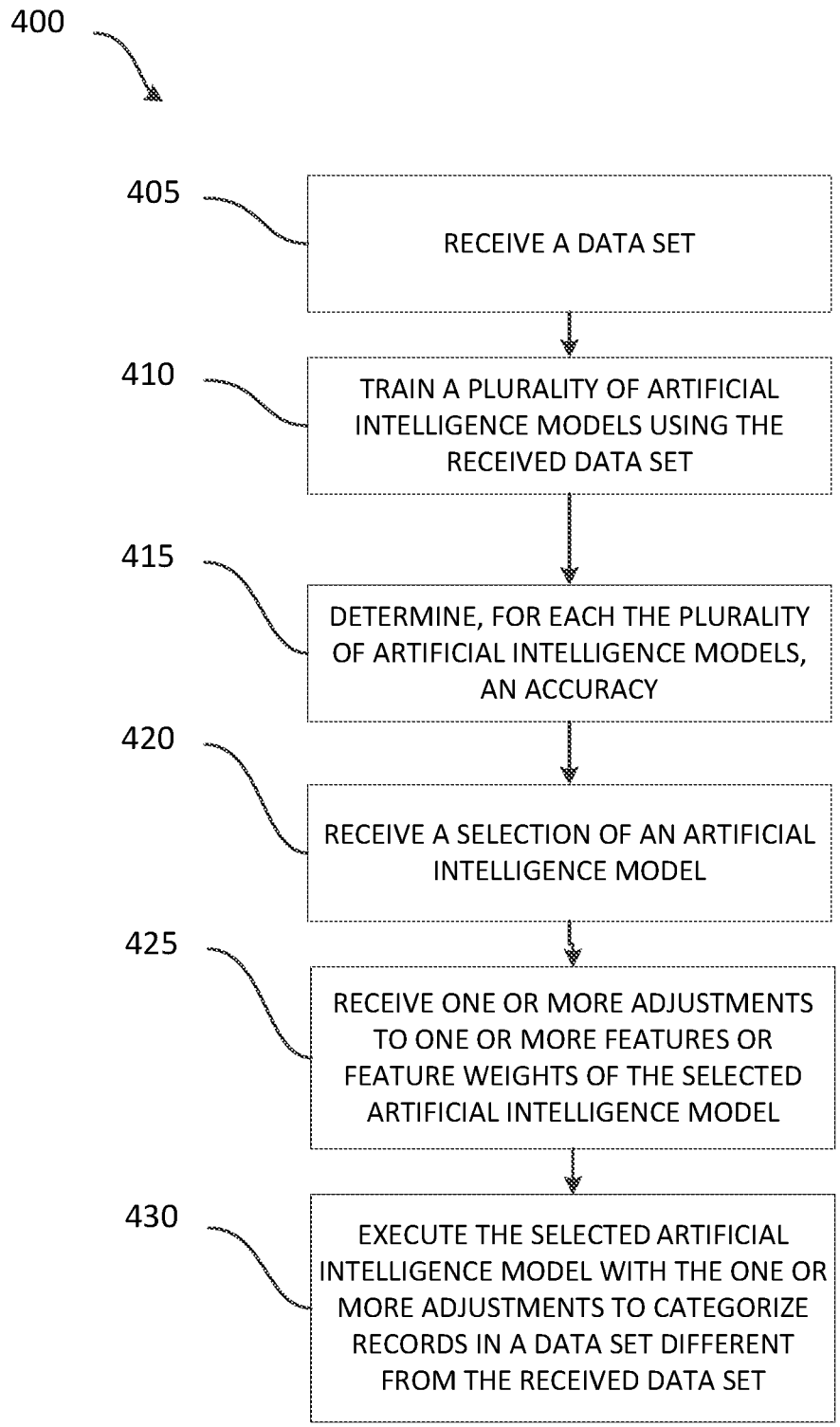
FIG. 4 is a flow chart illustrating a method for customizing an artificial intelligence model to process a data set using the system of FIG. 1 according to one embodiment.

FIG. 4 illustrates a method 400 of customizing an artificial intelligence model to process a data set. The method 400 begins, at step 405, when the electronic processor 300 receives a data set or a selection of a data set included in the database 325 from a user device (for example, the first user device 110). In some embodiments, the data set includes data included in a structured or unstructured data base. In some embodiments, the data in the data set is vectorized. The data set includes a plurality of records or entries.

Figure 5:
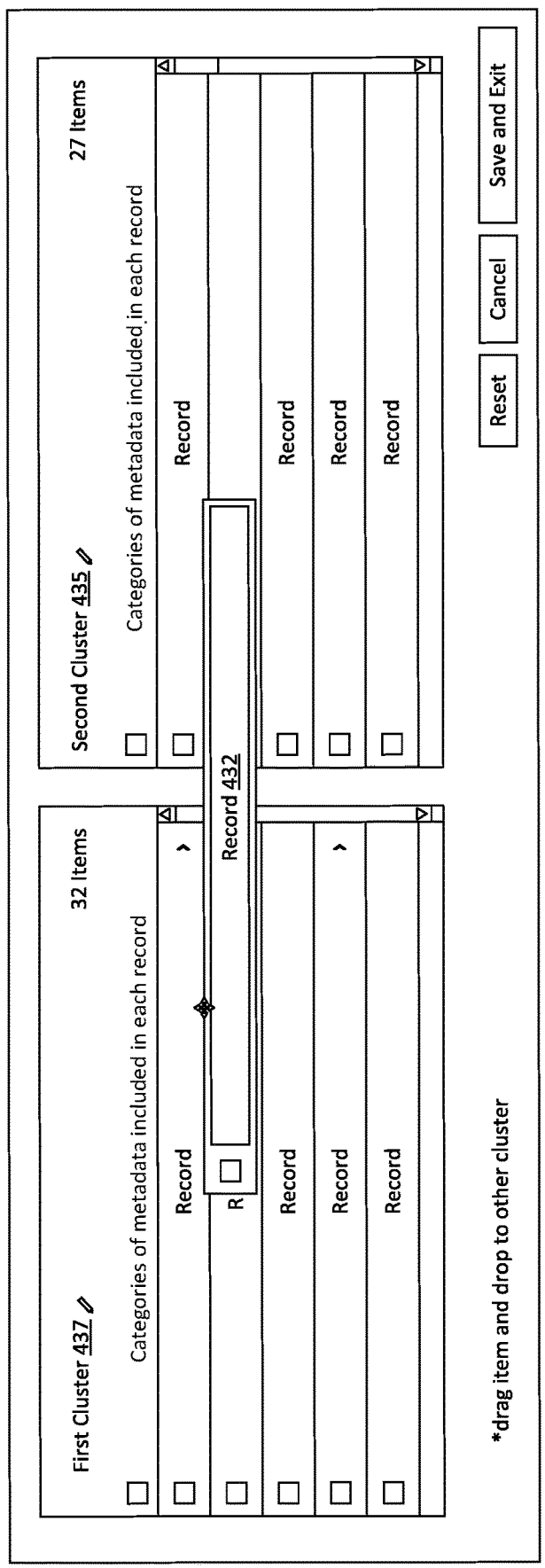
FIG. 5 illustrates an example graphical user interface including two clusters with a plurality of records in each and allowing users to refine the clusters to teach the artificial intelligence model to make better predictions.
Figure 6:
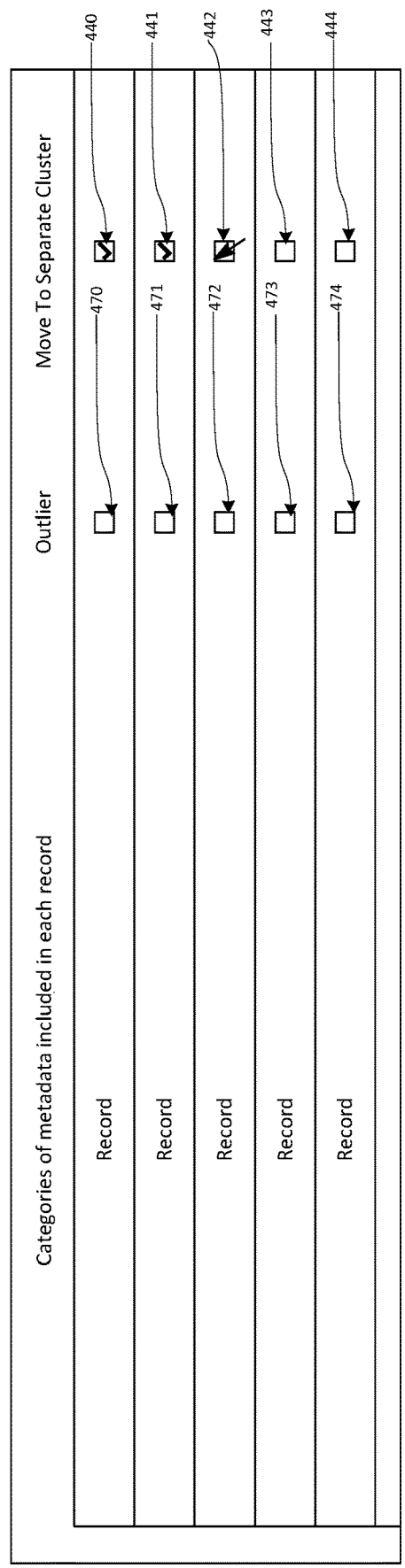
FIG. 6 illustrates an example graphical user interface including a list of a plurality of records and allowing a user to refine the cluster by specifying which records in the cluster are outliers, moving records to a new cluster, or moving records to a different existing cluster.

In some embodiments, the records in the received or selected data set are unlabeled. In order to label the records in the data set, in some embodiments, the electronic processor 300 sends the data set to the first user device 110. The first user device 110 may display, via the display device 215, the record in the data set as a table and may receive, via the input device 217 a label for each record. Labeling each individual record is labor intensive for a user and would take a long time. To speed up the process of labeling the records in the data set, the electronic processor 300 may execute a data science algorithm to cluster the data in the data set. The electronic processor 300 sends the unlabeled clusters to the first user device 110. In some instances, the electronic processor 200 displays a visual representation of each cluster and graphical interface tool is provided to allow a user to select a cluster to view the records displayed in the cluster. The electronic processor 200 may receive, from the input device 217, labels for each of the clusters. The label applied to the cluster is associated with each record included in the cluster. In some embodiments, the electronic processor 200 receives, via the input device 217, one or more adjustments to the clusters. For example, an adjustment to a cluster may be moving a record from one cluster to another cluster, merging two separate clusters, or the like. FIG. 5 illustrates an example of a graphical user interface displayed on a user device. In FIG. 5, a user, via an input device, is moving a record 432 from a second cluster 435 to a first cluster 437 by selecting the record 432 in the second cluster 435 and, for example, dragging the record 432 to the first cluster 437. FIG. 6 illustrates an example of a graphical user interface displayed on a user device in which a plurality of records are displayed. In the example illustrated in FIG. 6, a user may select checkboxes 440, 441, 442, 443, and 444 using an input device to select records to include in a new or different cluster. In the example illustrated in FIG. 6 checkboxes 440 and 441 have been selected indicating that the records associated with these checkboxes are to be grouped into a different cluster. A user may select checkboxes 470, 471, 472, 473, and 474 using an input device to select records to remove from the cluster. The electronic processor 200 sends the labeled, and possibly adjusted, clusters to the server 105. Using the labeled records or clusters, the electronic processor 300 labels the records in the data set and it should be understood that the data set described in the steps below includes labeled records.

Figure 7:
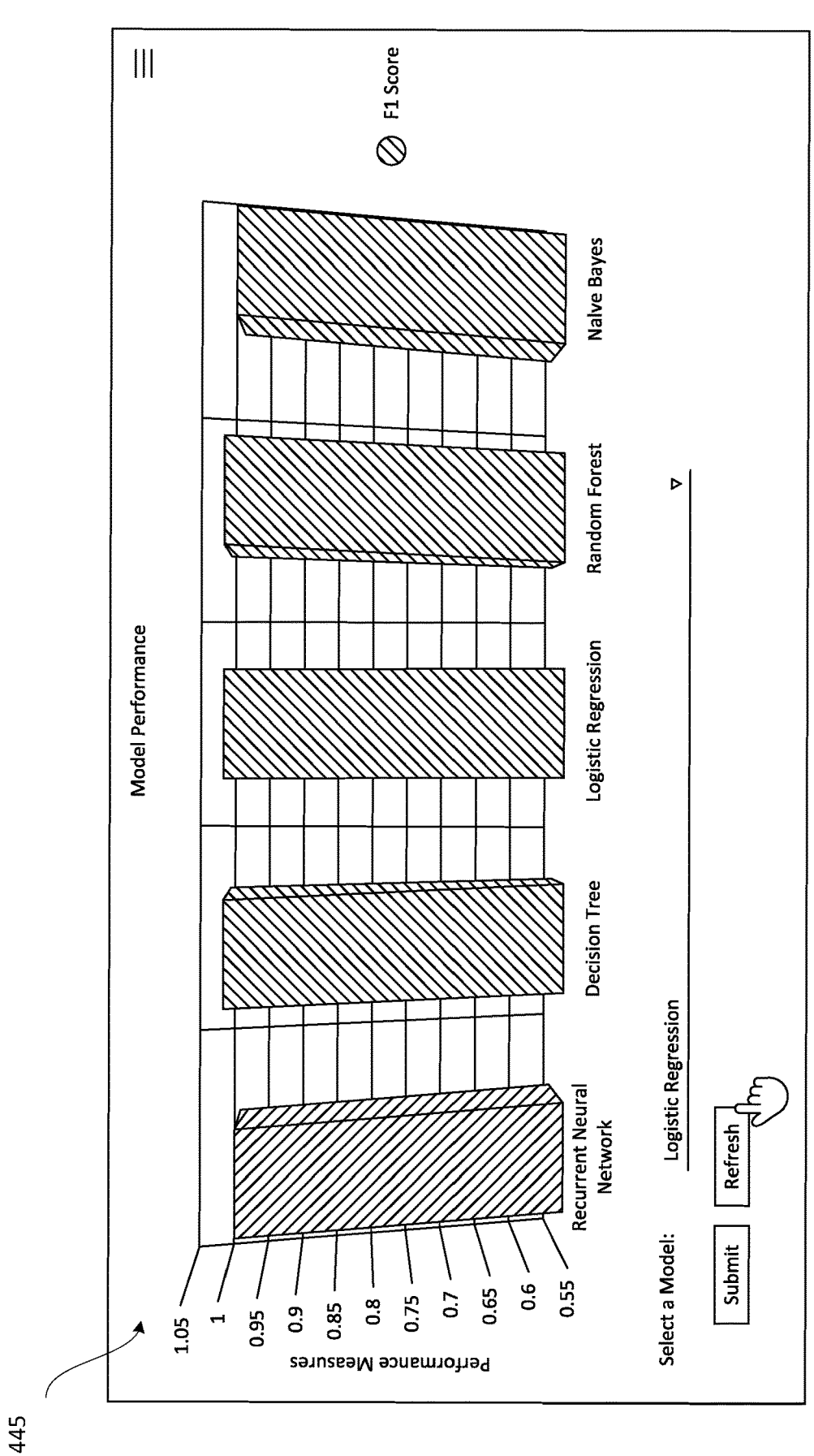
FIG. 7 illustrates an example graphical user interface for optimizing the training model including a chart illustrating an accuracy associated with each of a plurality of artificial intelligence models.

At step 410, the electronic processor 300 trains a plurality of artificial intelligence models using the received or selected data set. The plurality of artificial intelligence models may include a logistic regression model, a Bayesian network, a decision tree, a random forest, support vector machine, a recurrent neural network, a combination of the foregoing, or the like. At step 415, the electronic processor 300 determines the accuracy of each of the plurality of artificial intelligence models. In some embodiments, the accuracy of an artificial intelligence model is based on the percentage of records in a data set which the artificial intelligence model sorts into a correct cluster or category. A correct cluster for a record is a cluster with records similar to the record being clustered or categorized. For example, if the record is "cat" and possible clusters are "mammal," "fish," "reptile," "bird," and "amphibian," the correct cluster for the record "cat" is the cluster "mammal." In some embodiments, the accuracy may include a $F_1$ score for the artificial intelligence model instead of or in addition to the percentage of records in a data set which the artificial intelligence model sorts into a correct cluster or category. The $F_1$ score may be computed based on a precision (p) and a recall (r) associated with the artificial intelligence model. Precision is the number of true positives divided by the number of true positives and false positives returned by the artificial intelligence model. Recall is the number of true positives divided by the number of true positives and false negatives. In some embodiments, the electronic processor 300 sends, to the first user device 110, the accuracy determined for each of the plurality of artificial intelligence models. In some embodiments, the first user device 110 displays, via the display device 215, the accuracies associated with the plurality of artificial intelligence models. In some embodiments, the electronic processor 300 receives, from the first user device 110, a selection of an artificial intelligence model. In other embodiments, the electronic processor 300 automatically selects, from the plurality of artificial intelligence models, the artificial intelligence model with the highest accuracy. FIG. 7 illustrates an example graphical user interface displayed on a display device. The example graphical user interface illustrated in FIG. 7 includes a chart 445 illustrating the accuracy (or $F_1$ score) for each artificial intelligence model. The selected artificial intelligence model is saved along with the vectorized labeled training data.

Figure 8:
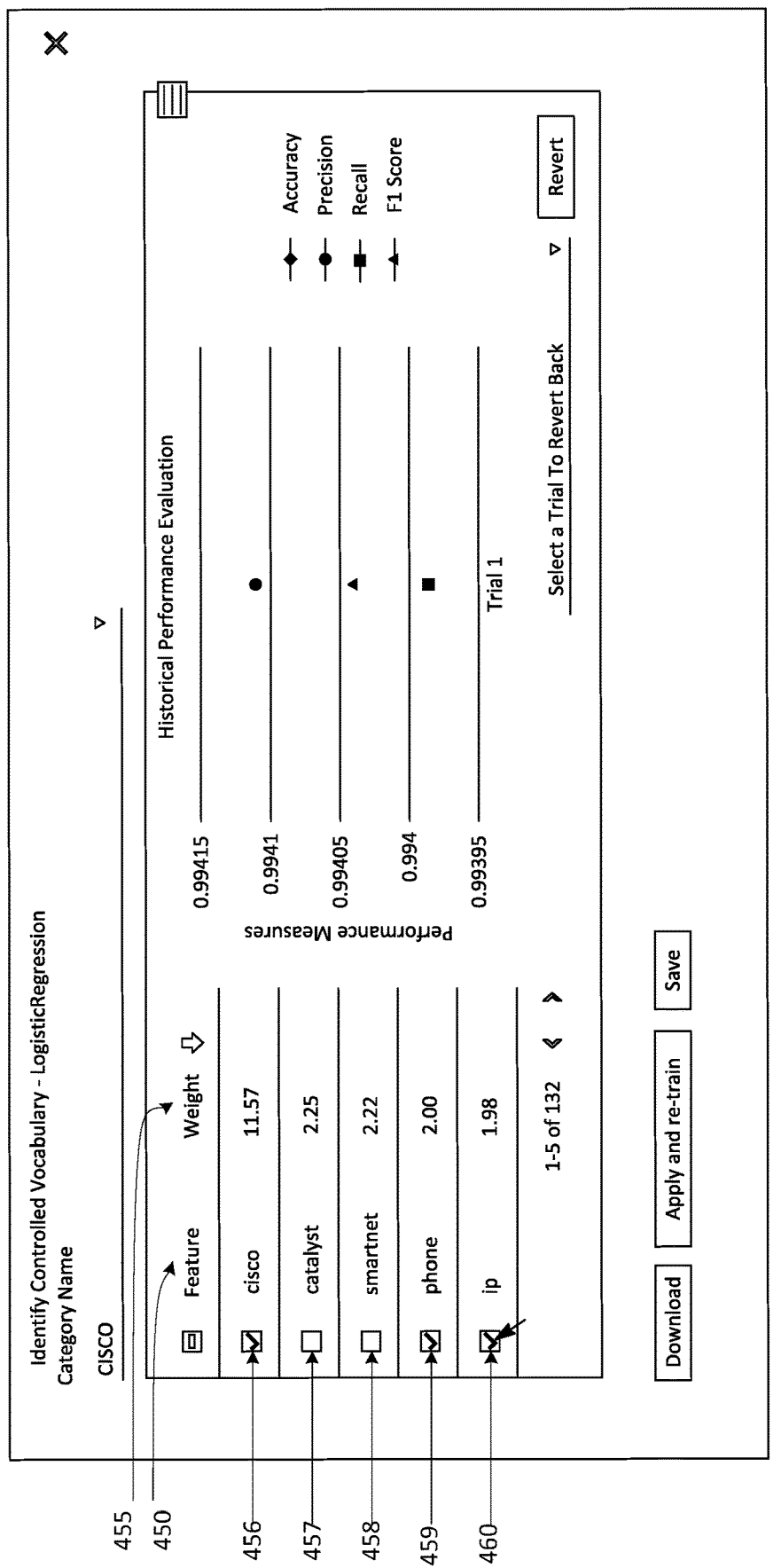
FIG. 8 illustrates an example graphical user interface including a list of a plurality of features and a list of weights.

Once the electronic processor 300 receives a selection of an artificial intelligence model at step 420, the electronic processor 300 sends, to the first user device 110, a plurality of features used by the selected artificial intelligence model to categorize or cluster the records included in the data set. In some embodiments, the electronic processor 300 also sends, for each of the plurality of features, a weight associated the feature. In some embodiments, the first user device 110 displays the features and weights it receives from the electronic processor 300. The user device 110 may receive, via, for example, the input device 217, adjustments to the features, weights, or both. For example, the first user device 110 may receive a selection of one or more features that the artificial intelligence model should no longer take into consideration when categorizing or clustering data. In another example, the first user device 110 may receive adjustments increasing or decreasing one or more of the weights. Increasing a weight causes the artificial intelligence model to base its decision of how to categorize or cluster a record more heavily on the feature associated with the weight. Decreasing a weight causes the artificial intelligence model to base its decision of how to categorize or cluster a record less heavily on the feature associated with the weight. FIG. 8 illustrates an example graphical user interface that may be displayed on a display device of a user device. The graphical user interface of FIG. 8 includes a list of a plurality of features 450 and a list of weights 455 associated with the features. A user may select or deselect, via an input device, features using the checkboxes 456, 457, 458, 459, and 460.

At step 425, the electronic processor 300 receives, from the first user device 110, one or more adjustments to one or more features or feature weights of the selected artificial intelligence model. The electronic processor 300, modifies the artificial intelligence model based on the adjustments to features and weights received from the first user device 110 and retrains the adjusted artificial intelligence model using the data set. In some embodiments, the electronic processor 300 performs scenario analysis. In other words, the electronic processor 300 determines the accuracy of the adjusted artificial intelligence model and, when the accuracy of the artificial intelligence model is lower with the adjustments than without the adjustments, the electronic processor 300 may revert the artificial intelligence model to its state before the adjustments received at step 425 were made. In some embodiments, the electronic processor 300 queries the first user device 110 for permission to revert the artificial intelligence model to its state before the adjustments received at step 425 were made and does not revert the artificial intelligence model unless confirmation that the artificial intelligence model may be reverted is received from the first user device 110. For example, the graphical user interface of FIG. 8 also includes a drop down menu 465 which allows a user to revert the features and weights to what they were before they were modified or at different points in time in the modification process.

At step 430, the electronic processor 300 executes the selected artificial intelligence model with one or more adjustments to cluster a data set that is different from the received data set. For example, the different data set may be a data set that includes records similar to the records included in the data set used to train the artificial intelligence model but the records included in the different data set are unlabeled. For each record included in the different data set, the artificial intelligence model predicts which cluster the record belongs in. In some embodiments, the artificial intelligence model is used by the electronic processor 300 (when executing the artificial intelligence microservice 340) to make predictions regarding records in the different data set. For example, if a support vector machine is selected as the artificial intelligence model to use for the price optimization of information technology (IT) products, the artificial intelligence microservice 340 will apply a support vector machine to predict the optimal prices of IT products. After records included in the different data set are clustered, in some embodiments, as described above with relation to FIGS. 5 and 6, the electronic processor 200 receives, via the input device 217, one or more adjustments to the clusters. When adjustments to the clusters are received, the customized artificial intelligence model may be retrained based on the adjustments to the clusters. In one example, the received data set may be the expense receipts for a company for the first quarter and the different data set may be the expense receipts for a company for the second quarter.

In some embodiments, once the artificial intelligence model is customized, the electronic processor 300 uses blockchain techniques to make the customized artificial intelligence model immutable. The immutable customized artificial intelligence model may be stored in the shared distributed ledger 330 and made available to multiple institutions or organizations. The customized artificial intelligence model stored in the shared distributed ledger 330 may be used to make future predictions. The shared distributed ledger 330 provides a procedural mechanism to prevent unauthorized changes (or bias) to be introduced to the immutable customized artificial intelligence model and hence enhances the trust in the customized artificial intelligence model.

Figure 9:
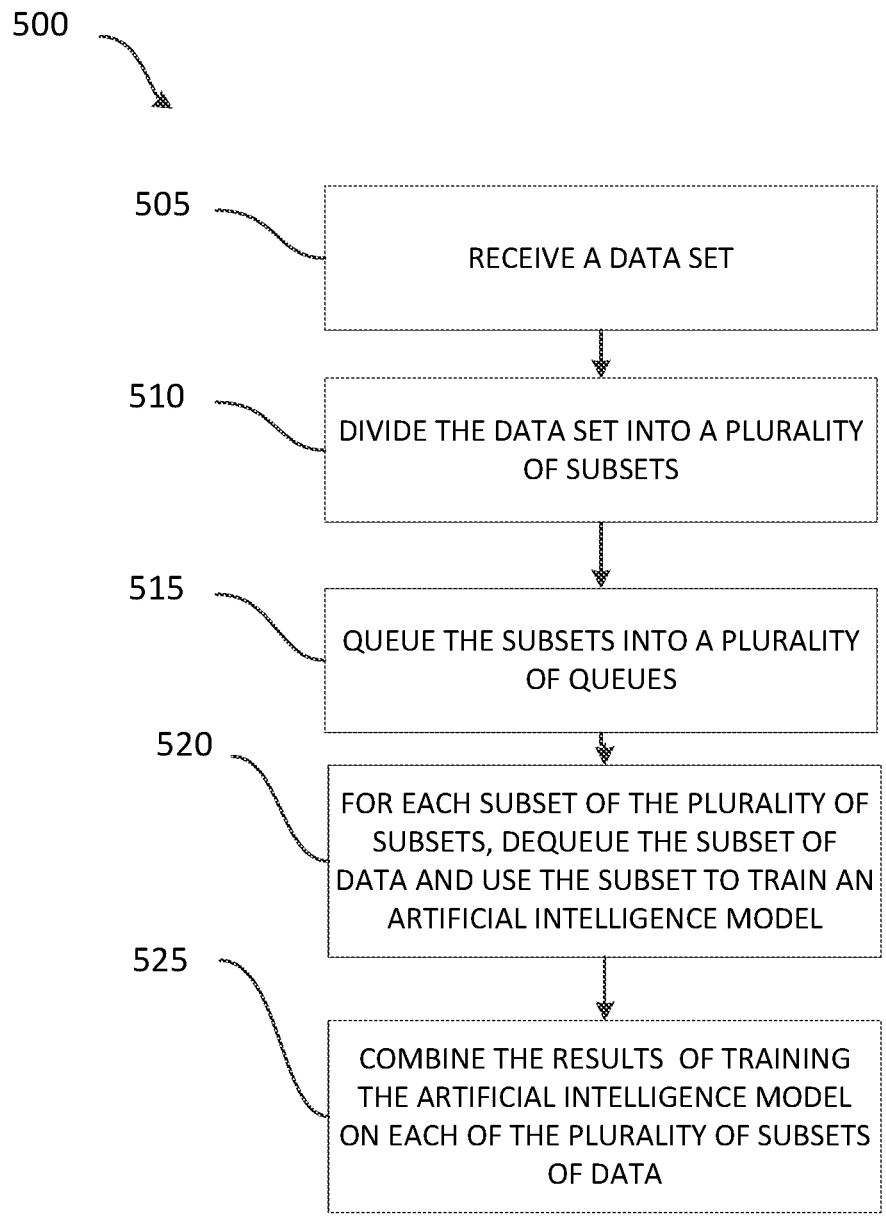
FIG. 9 is a flow chart illustrating a method for speeding up the process of training and executing artificial intelligence models using large data sets according to one embodiment.

Training and executing a plurality of artificial intelligence models to cluster a data set is, in general, both time consuming and requires a large amount of memory. To address this issue, embodiments herein utilize asynchronous programming and queuing. FIG. 9 illustrates an example method 500 of speeding up the process of training and executing artificial intelligence models using large data sets. The method 500 begins at step 505, when the electronic processor 300 receives a data set for customizing an artificial intelligence model as described above with respect to the method 400 or for analysis by a customized artificial intelligence model. At step 510, the electronic processor 300 divides the data set into a plurality of subsets of data. In some embodiments, the electronic processor 300 creates subsets having a threshold number of records or less. For example, when the electronic processor 300 receives a data set including 5366 records and the threshold number of records that may be included in a subset of data is 500, the electronic processor 300 divides the received data set into 10 subsets of 500 records a piece and 1 subset of 366 records. It should be understood that a data set may be divided into a plurality of subsets in a variety of ways other than the way described herein.

At step 515, the electronic processor 300 queues the subsets into a plurality of queues for processing by a plurality of child processes or tasks that can execute on a separate server or user device included in the system 100. In some embodiments, the electronic processor 300, distributes the subsets amongst the plurality of queues as evenly as possible. For example, given 12 subsets of data to add to 5 queues, the electronic processor 300 adds 3 subsets of data to two queues and 2 subsets of data to 3 queues. In other embodiments, the electronic processor 300, may determine how many data subsets to queue to each queue based on the number of subsets of data included in each queue. For example, the electronic processor 300 may add the greatest number of subsets of data to the queue that currently has the least number of subsets of data queued relative to the other queues in the plurality of queues.

At step 520, the electronic processor 300, for each subset of the plurality of subsets, dequeues the subset of data and uses the subset to train an artificial intelligence model or uses an artificial intelligence model to cluster the subset. In some embodiments, the subset is dequeued by one child process or task of a plurality of child processes or tasks. The child process analyzes the subset of data using an artificial intelligence model or trains the artificial intelligence model using the subset of data on a server or a user device included in the system 100 and connected to the server 105 via the communication network 120. It should be understood that each of the plurality of child processes may execute on a different server or user device connected to the server 105 via the communication network 120 depending on the number of servers, user devices, or both available, the number of subsets of data included in the queues, and the like. When the training or execution of an artificial intelligence model is complete, the results are returned to the server 105 and the child process, depending on the number of subsets included in the queues, proceeds to dequeue a next subset of data. In some embodiments, the electronic processor 300 may determine the queue that the child process dequeues a subset of data from is the queue with the largest number of subsets of data relative to the other queues. In other embodiments, a child process may be assigned to a queue and dequeue subsets of data from. The child processes run in an asynchronous fashion. In other words, the subsets of data do not need to be dequeued and processed in any particular order because the outcome of training an artificial intelligence model is not affected based on whether the artificial intelligence model is trained using a first subset of data before a second subset of data or vice versa. Additionally, the outcome of analyzing the data set using the artificial intelligence model is not affected based on whether the artificial intelligence model analyzes a first subset of data before a second subset of data or vice versa. In some embodiments, the child processes run in parallel rather than sequentially, ensuring that multiple subsets of data are processed at once.

In some embodiments, at step 525, the electronic processor 300 combines the results of training the artificial intelligence model on each of the plurality of subsets of data. In some embodiments, when training the artificial intelligence model, the electronic processor 300 vectorizes the artificial intelligence model and stores the vectorized artificial intelligence model in the database 325, the shared distributed ledger 330, or both. In some embodiments, the vectorized artificial intelligence model excludes personally identifiable information of uses to protect the privacy of users and the confidentiality of sensitive information. In other embodiments, the electronic processor 200, combines the results of analyzing each of the plurality of data subsets using the artificial intelligence model.

In some embodiments, the electronic processor 300 determines, based on the number of subsets included in the plurality of queues, whether to create (or "spin-up") one or more child processes or decommission one or more child processes. For example, the memory 305 may include a desired ratio of child processes to data subsets of 1:10 with a tolerance of +1/−1. In this example, the electronic processor 300 adds one or more child processes when the ratio is less than 1:11 and decommissions one or more child processes when the ratio is greater than 1:9. In some embodiments, the electronic processor 300 determines the ratio of child processes to data subsets and whether to create or decommission one or more child processes periodically (for example, once every 10 seconds). In other embodiments, the electronic processor 300 determines the ratio of child processes to data subsets and whether to create or decommission one or more child processes whenever a subset of data is added to or removed from one of the plurality of queues. In some embodiments, the electronic processor 300 may determine whether to create or decommission one or more child processes based on the average time it takes to train or execute an artificial intelligence model using each of the plurality of subsets of data included in a data set. When the average time is above a predetermined threshold (for example 10 seconds), the electronic processor 300 creates one or more child processes and when the average time is below a predetermined threshold (for example 3 seconds), the electronic processor 300 decommissions one or more child processes. By creating and decommissioning child processes based on need the electronic processor 300 ensures that results are delivered in a timely manner, processing power is not wasted, and the costs of operating the infrastructure are properly controlled.

In some embodiments, when a data set is received as described above in relation to the methods 400 and 500 the data set is selected from the database 325. In some embodiments, the database 325 includes a plurality of records which are received from a plurality of user devices (via, in some embodiments, one or more intermediary devices) as subsets of data or as a single record. In some embodiments, the artificial intelligence model configuration application 220 vectorizes the subset of data or record to render the data unreadable to humans before sending the data to the server 105 to be written in or stored on the database 325. While vectorized data is unreadable to humans, it may be used to train an artificial intelligence model and it may be analyzed by an artificial intelligence model. In some embodiments, when user permission is given, the electronic processor 200, sends raw unvectorized data to the server 105 in addition to the vectorized data. In some embodiments, metadata may also be sent by the electronic processor 200 to the server 105. Metadata includes, for example, a name, contact information, user address, device geolocation, user health, user preferences, user history, or the like.

Figure 10:
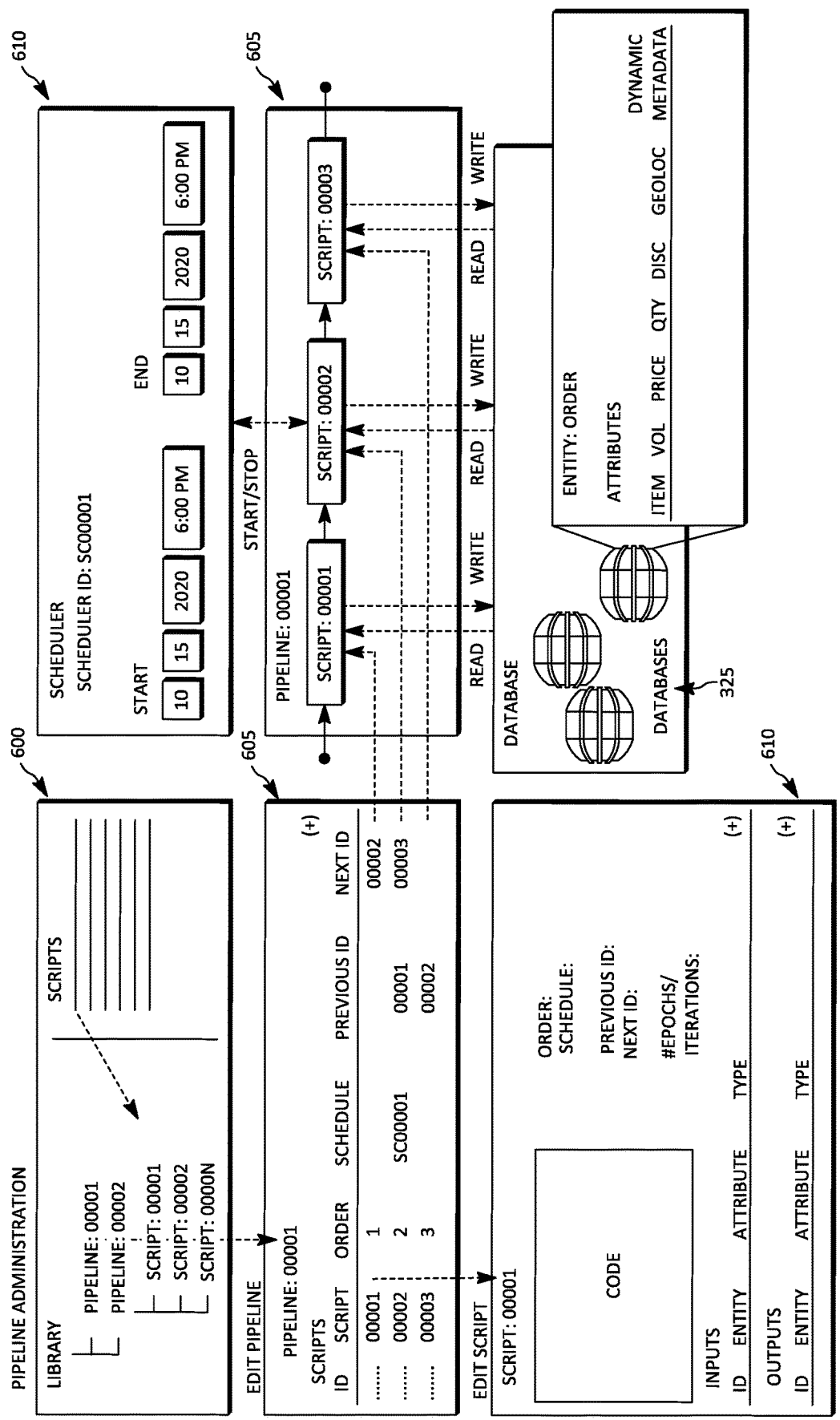
FIG. 10 is an example illustration of the editable or configurable nature of pipelines and scripts.

In some embodiments, the electronic processor 300 executes the pipeline software 335 to setup, configure, and manage one or more pipelines. A pipeline is collection of data science scripts executed in series or parallel. Each script is configurable and reads and writes data to the database 325. The electronic processor 300 may edit the schedule (start and stop times) of each script included in a pipeline, edit the order that scripts in a pipeline are performed in, add scripts to a pipeline, remove scripts from a pipeline, and edit code included in a script. FIG. 10 provides an illustration of the editable nature of pipelines and scripts. Block 600 illustrates how there are multiple pipelines each associated with one or more scripts and that scripts may be added to a pipeline. Block 605 illustrates the order of scripts in the pipeline. Block 610 illustrates the properties of a script. Block 615 illustrates a schedule associated with a script. Block 620 illustrates a pipeline with three scripts reading and writing to the database 325.

Figure 11A:
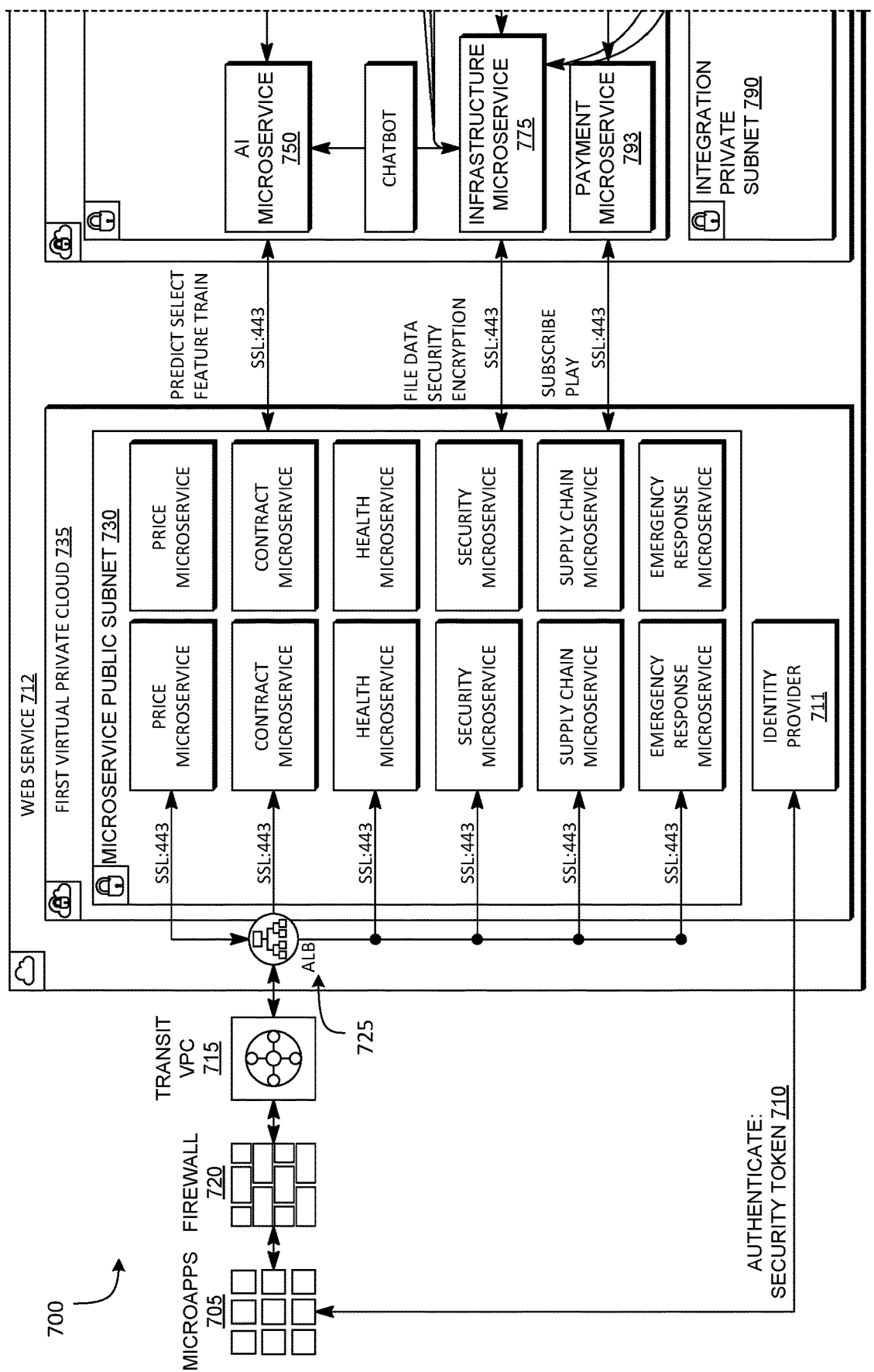
FIGS. 11A and 11B schematically illustrates a detailed example system for customizing an artificial intelligence model to process a data set according to one embodiment.
Figure 11B:
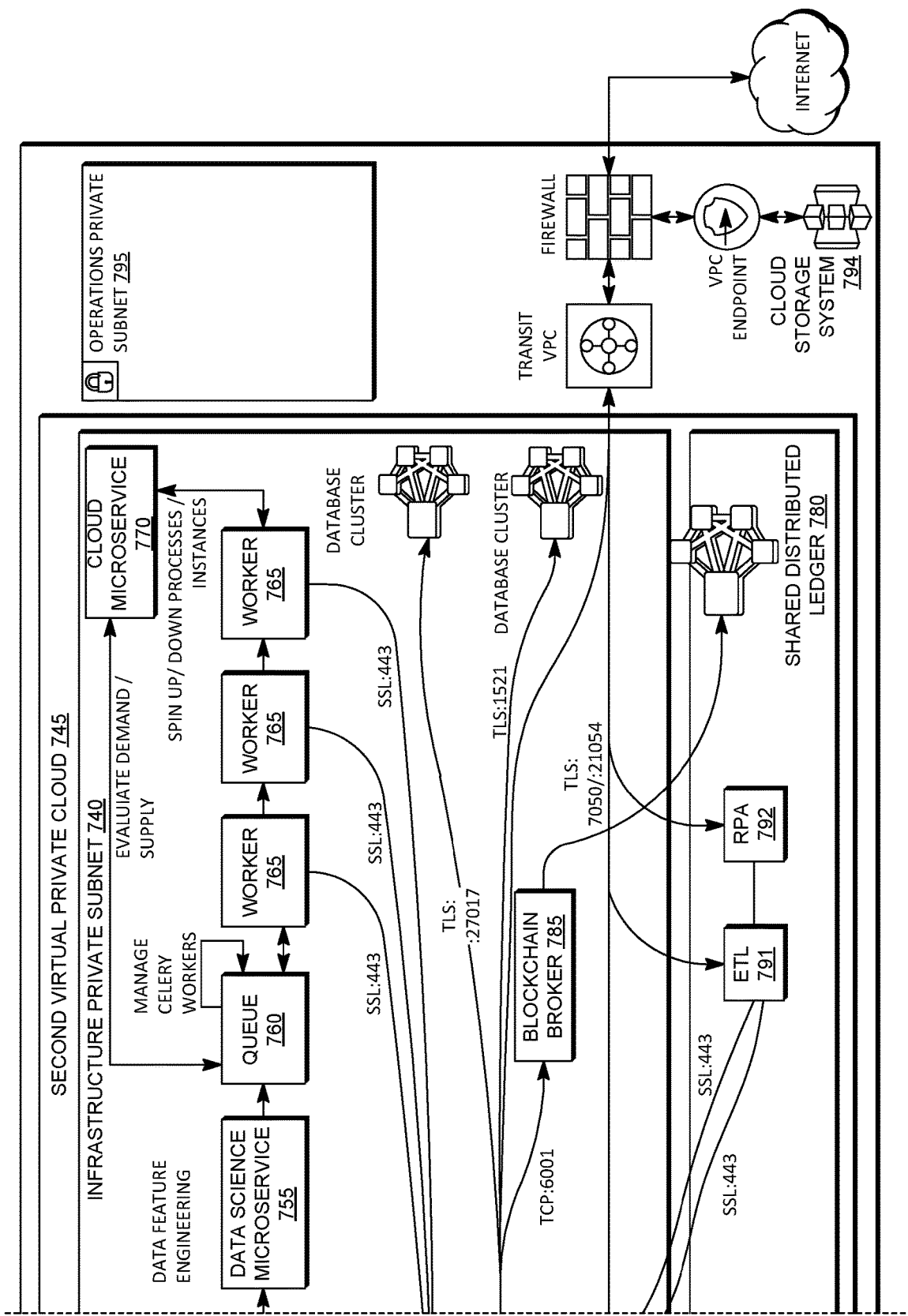

While FIG. 1 shows a simplified embodiment—the system 100, FIGS. 11A and 11B includes a detailed example embodiment—a system 700. The system 700 includes a plurality of microapplications 705. The microapplications are included in one or more user devices which users can access using a secure token 710 from an identity provider 711. The identity provider may be located in a web service 712, as illustrated in FIG. 11A, or outside of the web service 712. The microapplications 705 communicate with a transit virtual private cloud 715. Communications between the microapplications 705 and a transit virtual private cloud 715 are filtered by a firewall 720. The transit virtual private cloud 715 communicates with an ALB (Application Load Balancer) 725. The ALB 725 communicates with one or more microservices included in a microservice private subnet 730 which is a part of a first virtual private cloud 735. In the example included in FIGS. 11A and 11B, the one or more microservices include a price microservice, a contract microservice, a health microservice, a security microservice, a supply chain microservice, and an emergency response microservice. The microservice that a microapplication communicates with depends on the task to be performed. For example, if the task is to classify medical records, the microapplication 705 will communicate with the health microservice. The one or more microservices included in the microservice private subnet 730 communicate with an infrastructure private subnet 740 which is a part of a second virtual private cloud 745. The business microservices included in the microservice private subnet 730 communicate with the infrastructure private subnet 740 to consume foundational microservices for example, an artificial intelligence microservice, file microservice, data microservice, security microservice, encryption microservice, and payment microservice and subscription microservice. Foundational microservices are shared services available to business microservices. The infrastructure private subnet 740 includes an AI microservice 750 which communicates with a data science microservice 755. The data science microservice 755 communicates with one or more queues 760. A plurality of workers 765 (for example, Celery workers) extract data from the one or more queues 760 via child processes. The plurality of workers 765 and the one or more queues 760 communicate with a cloud microservice 770. The plurality of workers 765 also communicate with an infrastructure microservice 775 included in the infrastructure private subnet 740. The infrastructure microservice 775 communicates with one or more database clusters. The infrastructure microservice 775 sends data to a shared distributed ledger 780 through a blockchain broker 785 that encrypts the data. The shared distributed ledger 780 is included in an integration private subnet 790. The integration private subnet 790 also includes an ETL (extract, transform, load) process 791 for data migration and an RPA (robotic process automation) 792 that send data to the infrastructure microservice 775. The infrastructure private subnet 740 also includes a payment microservice 793. The payment microservice 793, ETL 791, RPA 792, and infrastructure microservice 775 communicate with a cloud storage system 794 and the internet through a transit virtual private cloud and a firewall. An operations private subnet 795 includes a plurality of software tools for implementing the first virtual private cloud 735 and the second virtual private cloud 745. For example, the operations private subnet 795 may include a Nessus® scanner provided by Tenable Network Security, Inc., Splunk® security information and event management solution by Splunk, Inc., a Gitlab® lifecycle tool provided by GitLab Inc., ClamAV® virus scanner provided by Cisco Systems, Inc., SonarQube® code scanner provided by SonarSource, and the like.

Figure 12:
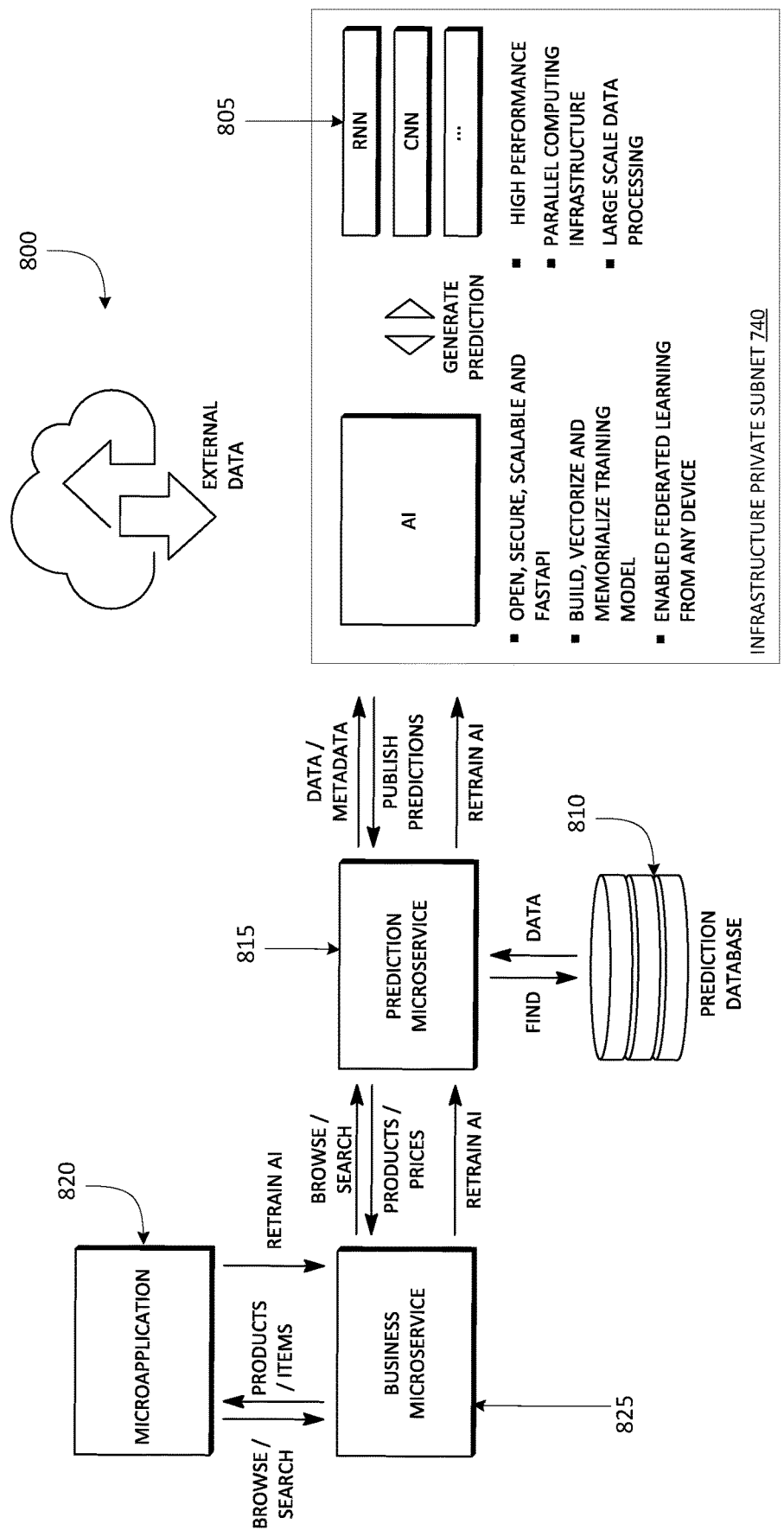
FIG. 12 is an example block diagram illustrating data traveling between components included in an example embodiment of a system for training or retraining an artificial intelligence model.

In some embodiments, the infrastructure private subnet 740 includes one or more open APIs that allow an external application or microapplication (for example, an application located in the memory 205 of the first user device 110) to embed artificial intelligence workflows into a business process. A user may retrain an artificial intelligence model embedded into a business process either continuously or one time by providing feedback including the modification or adjustment of one or more clusters generated by the artificial intelligence model. FIG. 12 provides a block diagram illustrating an example of data traveling between components included in an example embodiment of a system 800 for training or retraining an artificial intelligence model. It should be noted that the system 100 and the system 700 described above may also allow an artificial intelligence model to be trained or retrained.

In some embodiments, predictions made by an artificial intelligence model 805 (for example, a RNN, a CNN, or the like) are published to a prediction database 810 by a prediction microservice 815. In some embodiments, microapplications 820 utilize embedded artificial intelligence workflows to predict compliance, risk, fraud, savings, growth, vulnerability, and the like. Microapplications 820 included in, for example, a user device may embed artificial intelligence workflows into business processes to allow users who need not be data scientists to continuously train or retrain the artificial intelligence model 805. In some embodiments, microapplications 820 communicate with business microservices 825 which then relay retraining data (for example, adjustments to one or more clusters) to the infrastructure private subnet 740. Once within the infrastructure private subnet 740, the artificial intelligence model 805 is retrained, reclassifies data, and outputs the new predictions or reclassifications to a prediction microservice 815 and prediction database 820.

Various features and advantages of some embodiments are set forth in the following claims.

What is claimed is:

1. A system for customizing an artificial intelligence model to process a data set using information received from an electronic user device, the system comprising:
 a server including an electronic processor, the electronic processor programmed to:
  obtain vectorized digital records;
  for each artificial intelligence model of a plurality of artificial intelligence models,
   divide the vectorized digital records into a plurality of subsets;
   queue the plurality of subsets into a plurality of queues;
   receive, from a second server or a second electronic user device, a request to dequeue a subset of the plurality of subsets;
   execute on the second server or the second electronic user device a first child process to train the artificial intelligence model using the dequeued subset;
   in parallel with the execution of the first child process, execute a second child process on the second server, the second user device, or another server or user device included in the system to train the artificial intelligence model using a second subset of the plurality of subsets;
   receive from the second server or the second electronic user device a result of training the artificial intelligence model using the subset;
   combine the results of training the artificial intelligence model on each of the plurality of subsets; and
   determine an accuracy of the artificial intelligence model;
  select, based on the determined accuracies, an artificial intelligence model of the plurality of artificial intelligence models;
  receive, from the electronic user device, a selection of one or more adjustments to one or more features or feature weights of the selected artificial intelligence model; and
  execute the selected artificial intelligence model with the one or more adjustments to categorize digital records different from the obtained vectorized digital records.

2. The system according to claim 1, wherein the electronic processor is programmed to train each artificial intelligence model of the plurality of artificial intelligence models to categorize the vectorized digital records.

3. The system according to claim 1, wherein the electronic processor is programmed to send the determined accuracy for each of the plurality of artificial intelligence models to the electronic user device for display.

4. The system according to claim 1, wherein the electronic processor is programmed to modify the selected artificial intelligence model based on the received adjustments;
 determine an accuracy of the selected artificial intelligence model with the one or more adjustments; and
 when the accuracy of the selected artificial intelligence model with the one or more adjustments is less than the accuracy of the selected artificial intelligence model before the one or more adjustments were applied, revert the artificial intelligence model to its state before the one or more adjustments were applied.

5. The system according to claim 1, wherein the electronic processor is programmed to determine, based on a number of subsets included in the plurality of queues, whether to create one or more child processes or decommission one or more child processes.

6. The system according to claim 1, wherein the electronic user device includes one or more microapplications programmed to communicate with the electronic processor through one or more open application programming interfaces.

7. The system according to claim 1, wherein the electronic processor is further programmed to
 use blockchain techniques to make the selected artificial intelligence model with the one or more adjustments immutable; and
 store the immutable artificial intelligence model in a shared distributed ledger.

8. A method for customizing an artificial intelligence model to process a data set using information received from an electronic user device, the method comprising:
 obtaining vectorized digital records;
 for each artificial intelligence model of a plurality of artificial intelligence models,
  dividing the vectorized digital records into a plurality of subsets;
  queuing the plurality of subsets into a plurality of queues;
  receiving, from a server or a second electronic user device, a request to dequeue a subset of the plurality of subsets;
  executing on the server or the second electronic user device a first child process to train the artificial intelligence model using the dequeued subset;
  in parallel with the execution of the first child process, executing a second child process on the second server, the second user device, or another server or user device to train the artificial intelligence model using a second subset of the plurality of subsets;

receiving from the server or the second electronic user, a result of training the artificial intelligence model using the subset;

combining the results of training the artificial intelligence model on each of the plurality of subsets; and determining an accuracy of the artificial intelligence model;

selecting, based on the determined accuracies, an artificial intelligence model of the plurality of artificial intelligence models;

receiving, from the electronic user device, a selection of one or more adjustments to one or more features or feature weights of the selected artificial intelligence model; and executing the selected artificial intelligence model with the one or more adjustments to categorize digital records different from the obtained vectorized digital records.

9. The method according to claim 8, wherein each artificial intelligence model of the plurality of artificial intelligence models is trained to categorize the vectorized digital records.

10. The method according to claim 8, the method further comprising sending the determined accuracy for each of the plurality of artificial intelligence models to the electronic user device for display.

11. The method according to claim 8, the method further comprising
modifying the selected artificial intelligence model based on the received adjustments;

determining an accuracy of the selected artificial intelligence model with the one or more adjustments; and when the accuracy of the selected artificial intelligence model with the one or more adjustments is less than the accuracy of the selected artificial intelligence model before the one or more adjustments were applied, reverting the artificial intelligence model to its state before the one or more adjustments were applied.

12. The method according to claim 8, the method further comprising determining, based on a number of subsets included in the plurality of queues, whether to create one or more child processes or decommission one or more child processes.

13. The method according to claim 8, the method further comprising
using blockchain techniques to make the selected artificial intelligence model with the one or more adjustments immutable; and storing the immutable artificial intelligence model in a shared distributed ledger.

14. The method according to claim 8, the method further comprising
displaying clusters generated by executing the selected artificial intelligence model with the one or more adjustments to categorize digital records different from the obtained vectorized digital records;

receiving one or more adjustments to the clusters; and retraining the selected artificial intelligence model with the one or more adjustments based on the one or more adjustments to the clusters.

* * * * *